(12) United States Patent
Yamamoto et al.

(10) Patent No.: US 7,423,626 B2
(45) Date of Patent: Sep. 9, 2008

(54) LIGHT-EMISSION CONTROL CIRCUIT

(75) Inventors: Isao Yamamoto, Kyoto (JP); Koichi Miyanaga, Kyoto (JP)

(73) Assignee: Rohm Co., Ltd. (JP)

( * ) Notice: Subject to any disclaimer, the term of this patent is extended or adjusted under 35 U.S.C. 154(b) by 566 days.

(21) Appl. No.: 10/890,459

(22) Filed: Jul. 12, 2004

(65) Prior Publication Data

US 2005/0058450 A1    Mar. 17, 2005

(30) Foreign Application Priority Data

Sep. 12, 2003    (JP) ............................. 2003-322294

(51) Int. Cl.
*G09G 3/36* (2006.01)

(52) U.S. Cl. ........................ 345/102; 349/62

(58) Field of Classification Search ................ 345/102, 345/207, 83, 88; 348/223, 227, 265; 349/61, 349/62, 65; 362/583
See application file for complete search history.

(56) References Cited

U.S. PATENT DOCUMENTS

| 6,344,641 | B1 | 2/2002 | Blalock et al. | |
|---|---|---|---|---|
| 6,507,159 | B2 | 1/2003 | Muthu | |
| 6,674,060 | B2 * | 1/2004 | Antila | 250/205 |
| 6,801,177 | B2 * | 10/2004 | Kudo et al. | 345/89 |
| 6,888,528 | B2 * | 5/2005 | Rai et al. | 345/102 |
| 6,975,369 | B1 * | 12/2005 | Burkholder | 349/61 |
| 7,022,960 | B2 * | 4/2006 | Yamamoto et al. | 250/205 |
| 7,108,413 | B2 * | 9/2006 | Kwong et al. | 362/583 |
| 2004/0004437 | A1 * | 1/2004 | Shimizu et al. | 313/512 |
| 2004/0027325 | A1 * | 2/2004 | Suwa et al. | 345/102 |
| 2005/0035939 | A1 * | 2/2005 | Akiyama | 345/102 |

FOREIGN PATENT DOCUMENTS

| JP | 08-313879 | * 11/1996 |
|---|---|---|
| JP | 2000-180850 | 6/2000 |
| JP | 2002-149135 | 5/2002 |
| JP | 2003-005714 | 1/2003 |
| JP | 2004-029141 | 1/2004 |
| JP | 2004-184852 | 2/2004 |
| JP | 2004-193029 | 7/2004 |
| JP | 2004-317558 | 11/2004 |
| JP | 2004-361618 | 12/2004 |

OTHER PUBLICATIONS

Japanese Office Action dated Nov. 29, 2005.
Chinese Office Action for Application No. 200410076864.8 dated Feb. 2, 2007 with English translation.

* cited by examiner

*Primary Examiner*—Richard Hjerpe
*Assistant Examiner*—Shaheda A Abdin
(74) *Attorney, Agent, or Firm*—Cantor Colburn LLP (57) ABSTRACT

Light-emitting parts are attached to a light guide plate of a backlight unit so as to be illuminated by the backlight. A measuring unit formed by light-receiving parts is provided on the opposite side of the light guide plate. The measuring unit detects the luminance or color tone of light inside the light guide plate. A control unit subjects the luminance or color tone to feedback control in accordance with a result of measurement.

20 Claims, 6 Drawing Sheets

LIGHT-EMISSION CONTROL CIRCUIT

BACKGROUND OF THE INVENTION

1. Field of the Invention

The present invention generally relates to a light emission control circuits and, more particularly, to a circuit for controlling light emission of light-emitting devices for illumination of a liquid crystal panel.

2. Description of the Related Art

Liquid crystal display apparatuses are widely used in portable terminals such as a notebook personal computer. A liquid crystal panel in a liquid crystal display apparatus is illuminated from behind by a backlight so that desired display is obtained as a result of blocking and transmission of light caused by interaction between a liquid crystal and a polarizing filter. A liquid crystal display apparatus is generally known for its low power consumption and will continue to be one of the key display apparatuses.

A line light source such as a fluorescent tube, which is usually capable of illuminating the entirety of a panel at an equal level, is used in a personal computer due to the availability of a substantially sufficient amount of space for a light source. In a portable terminal, however, there is a need to avoid a light source that requires an excessively large housing space or an extremely high lighting voltage. For this reason, many portable terminals today use light-emitting diodes capable of being lighted at a relatively low voltage. Japanese Patent Laid Open Publication 2000-180850 proposes a structure of a liquid crystal display apparatus using the diode.

An idea should be introduced in order to allow the light emitted by light-emitting diodes to reach the entirety of a panel at an equal level. Japanese Patent Laid Open Publication mentioned above discloses reduction of ununiformity of light using a light guide panel but does not, however, disclose how the degree of ununiformity is managed nor does it disclose taking into account unit-to-unit variation or time-dependent change of a light source. Granting that the light is controlled to be uniform, the disclosure in the patent document overlooks too high or too low an overall luminance level. A combination of red (R), green (G) and blue (B) light-emitting diodes to provide backlight is not capable of desirable light emission unless a proper luminance balance is achieved. The patent document is also silent as to how the luminance balance is managed.

Related Art List
  JPA laid open 2000-180850

SUMMARY OF THE INVENTION

The present invention is done in the existing state of technology described above and has an objective of providing a light-emission control circuit capable of providing a uniform backlight to a liquid crystal panel using light-emitting devices or enabling desired backlight luminance and color tone.

The light-emission control circuit according to one aspect of the present invention comprises: n kinds of light-emitting devices each producing one of first through nth colors, where n is an integer equal to or greater than 2; a measuring unit for measuring the first through nth color components included in a synthesized light produced by the total of n kinds of light-emitting devices operating in a liquid crystal panel; and a control unit for adjusting the luminance of the total of n kinds of light-emitting devices, based on the measurement by the measuring unit. With this construction, it is possible to adjust the luminance of light-emitting devices using feedback control. Since the n kinds of light-emitting devices produce different colors, an optimal color tone is produced by optimizing the luminance balance of the light-emitting devices.

The light-emission control circuit according to another aspect of the present invention comprises: n kinds of light-emitting devices each producing one of first through nth colors, where n is an integer equal to or greater than 2; n measuring units each measuring one of the first through nth color components included in a synthesized light produced by the total of n kinds of light-emitting devices operating in a liquid crystal panel; and a control unit for adjusting the luminance of the total of n kinds of light-emitting devices, based on the measurement by the measuring units.

The light-emission control circuit according to still another aspect of the present invention comprises: n light-emitting devices, where n is an integer equal to or greater than 2; a measuring unit for measuring the luminance of the total of n light-emitting devices operating in a liquid crystal panel; and a control unit for adjusting the luminance of the total of n light-emitting devices, based on the measurement by the measuring unit. According to this aspect of the invention, the n light-emitting devices may produce the same color. In this case, desired luminance is obtained using feedback control. The desired luminance may be the overall luminance produced by the n light-emitting devices as a whole or the individual devices.

According to the light-emitting control circuit of the present invention, it is possible to provide a uniform light or a light of desired luminance or color tone to the entirety of a liquid crystal panel.

BRIEF DESCRIPTION OF THE DRAWINGS

Other objects and further features of the present invention will be apparent from the following detailed description when read in conjunction with the accompanying drawings, in which.

DETAILED DESCRIPTION OF THE INVENTION

The embodiments according to the invention will be described briefly. The light-emission control circuit according to the first embodiment and the sixth embodiment, a variation of the first embodiment, comprises three light-emitting diodes producing R, G and B colors, respectively; three measuring units each measuring one of the R, G and B color components included in a synthesized light produced by the three light-emitting diodes operating in a liquid crystal panel; and a control unit for adjusting the luminance of the light-emitting diodes, based on the measurement by the measuring units. As another embodiment relevant to the measuring unit, the light-emission control circuit may comprise a measuring unit for measuring the R, G and B color components. The measuring units are implemented, for example, by photodetectors such as photodiodes and phototransistors. In this construction, the luminance of the three kinds of light-emitting diodes are adjusted so that the light before transmission through the liquid crystal panel matches a reference white light (first embodiment) or the light after transmission through the liquid crystal panel matches a reference white light (sixth embodiment). Therefore, the first and sixth embodiments are designed to adjust the balance of luminance produced by the plurality of light-emitting devices and focuses on the color tone of the synthesized light. Although the R, G and B colors were discussed above, the requirement is that the luminance of light-emitting devices such as light-emitting diodes corresponding to a plurality of colors is adjusted. The number of the light-emitting devices provided for each color is irrelevant to the purpose of the invention.

The second through fifth embodiments focus on the overall luminance produced by a plurality of light-emitting diodes as a whole or the luminance of the individual light-emitting diodes. The light-emission control circuit according to the second embodiment comprises: a plurality of light-emitting diodes; a measuring unit for measuring the luminance of the light-emitting diodes operating in a liquid crystal panel; and a control unit for adjusting the luminance of the light-emitting diodes, based on the measurement by the measuring unit. Unlike the first and sixth embodiments, the plurality of light-emitting diodes may produce the same color. Hereinafter, it is assumed that the plurality of diodes produce a white light. The produced color may be the same since the second through fifth embodiments only focus on the luminance. The control unit may effect control such that the plurality of light-emitting diodes produce the same luminance (fifth embodiment) or the overall luminance produced by the diodes as a whole is compared with a predetermined value and controlled collectively, based on the measurement result (second through fourth embodiments).

According to the first and sixth embodiments that focus on color tone, it is possible to match the color tone of a backlight to a reference color and cancel unit-to-unit variation of light-emitting diodes or time-dependent change in characteristics. According to the second through fifth embodiments focusing on luminance, it is possible to match the overall luminance of a backlight to a reference value or provide a uniform illumination in which nonuniformity in the luminance of a backlight is eliminated. In a similar configuration as the first and sixth embodiments, the second through fifth embodiments is capable of canceling unit-to-unit variation etc. of the light-emitting diodes.

FIRST EMBODIMENT

Figure 1:
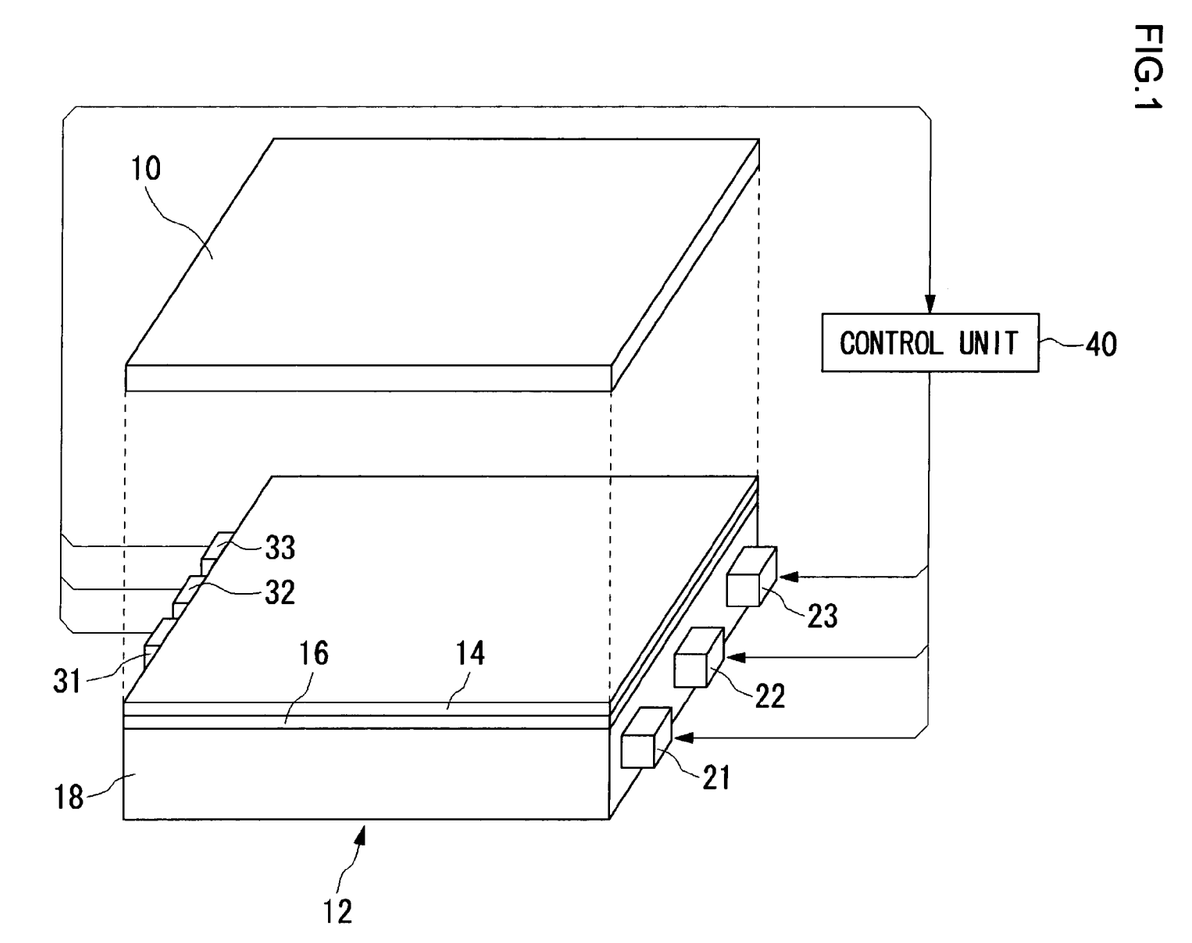
FIG. 1 schematically shows an overall construction in which a light-emission control circuit according to the first embodiment is applied to a liquid crystal display apparatus.

FIG. 1 schematically shows an overall construction in which the light-emission control circuit according to the first embodiment is applied to a liquid crystal display apparatus. The liquid crystal display apparatus is provided with a liquid crystal panel 10 and a backlight unit 12. The liquid crystal panel 10 may be any transmissive or semi-transmissive liquid crystal panel. For example, a twist nematic (TN) liquid crystal, a super twist nematic (STN) liquid crystal or a thin-film transistor (TFT) liquid crystal may be used. The construction of the liquid crystal panel 10 is not illustrated in detail since it is popularly known. For example, a polarizing filter, a glass or plastic substrate, a transparent electrode, an alignment layer, a liquid crystal material, an alignment layer, a transparent electrode, a color filter, a glass substrate, a polarizing plate are arranged in the ascending order of distance from the backlight unit 12. The liquid crystal material fills a space between the alignment layers. The liquid crystal panel 10 is integrally formed.

The backlight unit 12 is also integrally formed such that a light guide plate 18 that causes the light emitted by the light source and entering the side of the plate to reach the entirety of the back of the liquid crystal panel 10, a diffuser plate 16 provided on the surface of the light guide plate 18 and a color filter 14 transmitting the diffused light are provided in the descending order of distance from the liquid crystal panel 10. The color filter 14 is formed by polyethylene terephthalate (PET) or polycarbonate (PC) resin. The diffuser plate 16 is formed by roughening the surface of a transparent resin plate. The diffuser plate 16 should be made of a material characterized by a small light loss and a high light diffusion coefficient. Polycarbonate (PC) resin or acrylic resin, characterized by a relatively high transparency, is used to form the light guide plate 18. A light-reflecting mechanism (not shown) is provided in a housing to face the back of the light guide plate 18. In an apparatus in which the housing is not provided with the reflecting mechanism, a reflecting plate (not shown) is adhesively attached to the back of the light guide plate 18. FIG. 1 contains an exploded view for ease of understanding of the construction and the scale thereof may be different from the actual scale.

Adhesively attached to the side of the light guide plate 18 is a first light-emitting part 21, a second light-emitting part 22 and a third light-emitting part 23. Each of these parts emits a white light. Independent R, G and B light-emitting diodes are provided in each of the light-emitting parts. The opposite side of the light guide panel 18 is provided with a first light-receiving part 31, a second light-receiving part 32 and a third light-receiving part 33. The light-receiving parts constitute a measuring unit. The first light-receiving part 31, the second light-receiving part 32 and the third light-receiving part 33 detect R, G and B color components, respectively. The result of detection is sent to a control unit 40.

The control unit 40 refers to the result of detection by the three light-receiving parts and checks the RGB luminance balance against a reference level. The control unit 40 controls how the first light-receiving part 31, the second light-receiving part 32 and the third light-receiving part 33 are driven in accordance with the luminance level. As a result of feedback control, a desired tone of color is produced.

Figure 2:
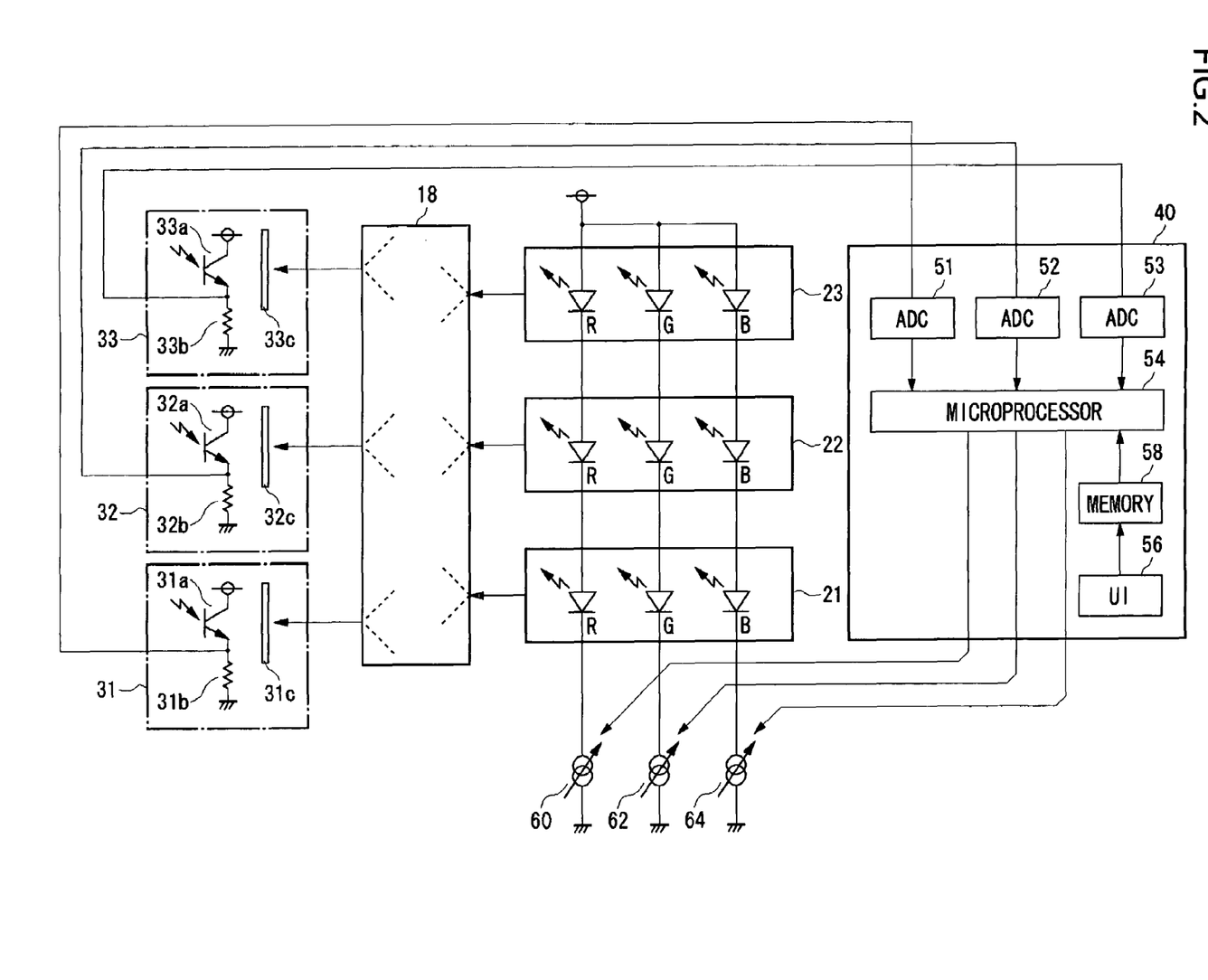
FIG. 2 shows an overall construction of the circuit of FIG. 1.

FIG. 2 shows an overall construction of the circuit of FIG. 1. Each of the first light-emitting part 21, the second light-emitting part 22 and the third light-emitting part 23 at the center of the figure includes R, G and B light-emitting diodes. The three R light-emitting diodes included in the first light-emitting part 21, the second light-emitting part 22 and the third light-emitting part 23 are coupled in series between a power supply and a first constant-current supply 60. Similarly, three G light-emitting diodes are coupled in series between the power supply and a second constant-current source 62, and three B light-emitting diodes are coupled in series between the power supply and a constant-current supply 64. A white light resulting from the combination of R, G and B components and emitted by the first light-emitting part 21, the second light-emitting part 22 and the third light-emitting part 23 is led to the light guide plate 18. A synthesis of the incident white light reaches the measuring unit via the light guide plate 18.

The measuring unit is provided with the first light-receiving part 31, the second light-receiving part 32 and the third light-receiving part 33. These parts measure the luminance of R, G and B light components, respectively. The first light-receiving part 31 is provided with a first phototransistor 31*a* and a first resistor 31*b* coupled in series between a power supply and the ground. A result of detection is output as a voltage signal from a node between the transistor and the ground. A red (R) filter 31*c* is provided between the first phototransistor 31*a* and the light guide plate 18 so that the phototransistor 31*a* detects only the R component. The second light-receiving part 32 and the third light-receiving part 33 are constructed similarly. The filters are denoted by respective reference symbols in the figure, a green (G) filter 32*c* provided in the second light-receiving part 32 being transparent only to the G component and a blue (B) filter 33*c* provided in the third light-receiving part 33 being transparent only to the B component. For prevention of entry of ambient light, the space sandwiched by the light guide plate 18, the first light-receiving part 31, the second light-receiving part 32 and the third light-receiving part 33 is masked or similarly processed.

The control unit 40 is provided with a first A/D converter 51, a second A/D converter 52 and a third A/D converter 53, the A/D converter being denoted in the figure by a reference symbol "ADC". The A/D converters receive the measurement result from the first light-receiving part 31, the second light-receiving part 32 and the third light-receiving part 33 in the form of a voltage signal. The converters convert the signal into a digital value and output the same to a microprocessor 54. The digital value derived from the measurement of R, G and B components will be referred to as an R measurement, a G measurement and a B measurement, respectively. These three measurements will generically be referred to as measurements.

A memory 58 has a ROM and a RAM built therein. The ROM is provided with a table containing an R reference value, a G reference value and a B reference value with which the R measurement, the G measurement and the B measurement are compared, respectively (the ROM, RAM and table are not shown). The R reference value, the G reference value and the B reference value are generically referred to as reference values. The reference values correspond to a target white light. User-specified color tone configuration information is written in the RAM of the memory 58 via an UI part 56 providing a user interface. The UI part 56 provides an environment necessary for operation for adjusting the displayed color tone according to the user's preference. When the user designates a color tone, the RGB values (hereinafter, referred to as designated values) corresponding to the designated color tone are given precedence over the reference values.

The microprocessor 54 receives the measurements from the first A/D converter 51, the second A/D converter 52 and the third A/D converter 53, and reads the designated value from the memory 58 so as to effect feedback control for matching the measurements to the designated value. When the designated value is not provided, the microprocessor 54 controls the measurements to match the reference values. Control is effected independently in the first constant-current source 60, the second constant-current source 62 and the third constant-current source 64. When the R component is insufficient, for example, the microprocessor 54 drives the first constant-current source 60 so that it supplies a larger current.

Thus, according to the first embodiment, it is possible to configure a backlight to produce a preset color tone or a color tone designated by the user. The following variations of the first embodiment are practicable.

1. The first constant-current source 60 may be a constant-voltage source. In this case, if the R component is insufficient the voltage across the three R light-emitting diodes may be raised so that the diodes emit light at a higher luminance.

2. A switch may be inserted in series with the first constant-current source 60 so that duty control such as pulse width modulation (PWM) control using the switch is effected. In this case, the light-emitting diode is driven only when the switch is on so that desired luminance is easily achieved by controlling the duty ratio.

3. Instead of subjecting the constant-current source to control, a combination of a constant-voltage source and PWM control may be used. In this case, desired luminance is easily achieved by controlling the duty ratio.

4. The control unit 40 according to the first embodiment uses algorithmic control using the microprocessor 54. Alternatively, the control may be effected using a circuit without the microprocessor 54. In this case, the control unit 40 may be replaced by three comparator systems. One of the terminals of the comparator may receive a voltage signal from the light-receiving part such as the first light-receiving part 31 and the other terminal may receive a reference voltage so that the output of the comparator may directly control the constant-current source such as the first constant-current source 60. Since the microprocessor 54 is not necessary in this configuration, the processing load is reduced so that the processing speed is generally increased.

The variations described above are equally practicable in the following embodiments.

SECOND EMBODIMENT

Figure 3:
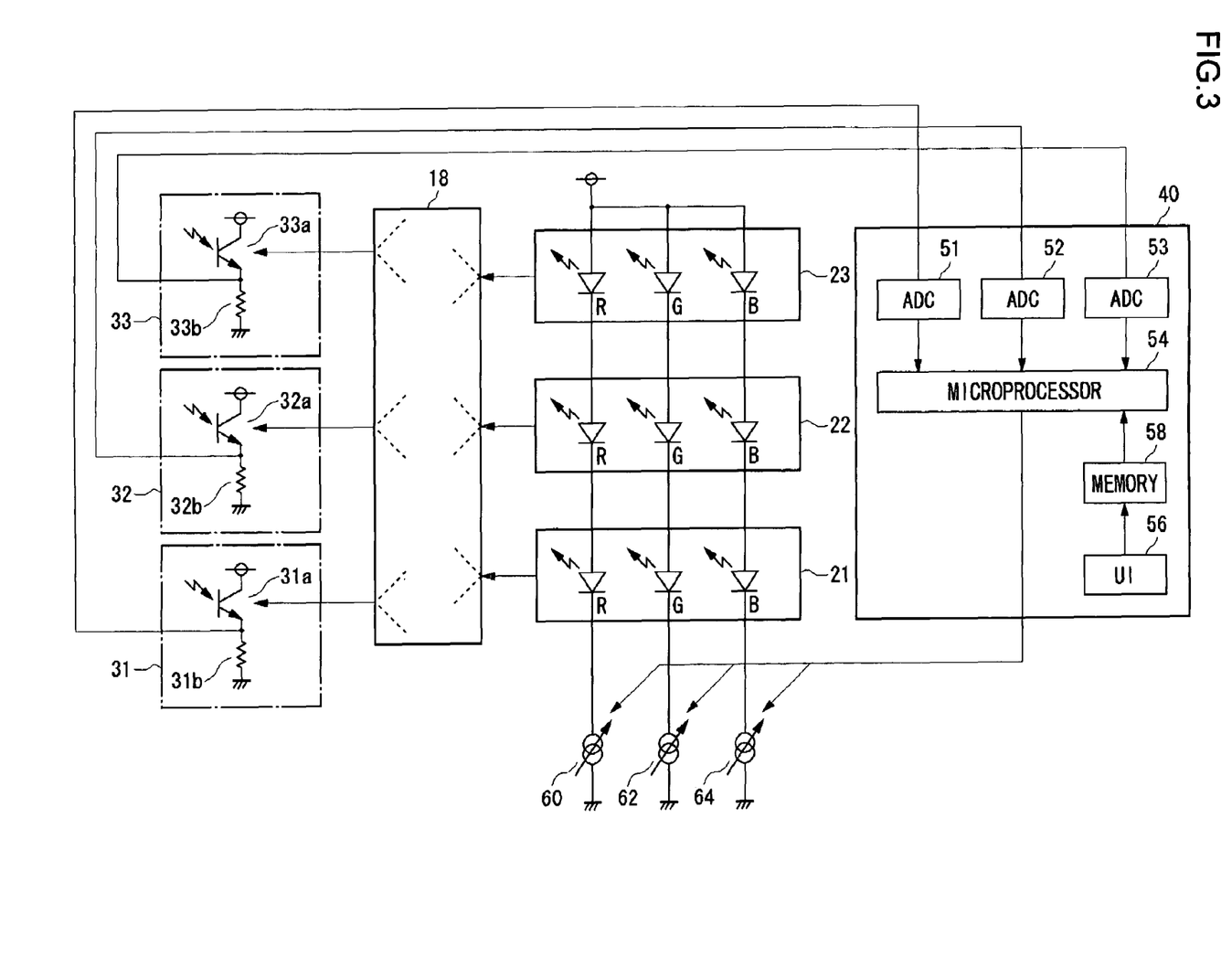
FIG. 3 schematically shows an overall construction in which a light-emission control circuit according to the second embodiment is applied to a liquid crystal display apparatus.

FIG. 3 schematically shows an overall construction in which a light-emission control circuit according to the second embodiment is applied to a liquid crystal display apparatus. Hereinafter, those elements that are identical to the elements of FIG. 2 are designated by the same reference symbols and the description thereof is omitted. The following description mainly concerns differences from the configuration of FIG. 2.

As shown in FIG. 3, according to the second embodiment, the R filter 31*c*, the G filter 32*c* and the B filter 33*c* are removed from the first light-receiving part 31, the second light-receiving part 32 and the third light-receiving part 33 of the measuring unit, respectively. The first phototransistor 31*a*, the second phototransistor 32*a* and the third phototransistor 33*a* directly detect light from the light guide plate 18. The microprocessor 54 controls the first constant-current source 60, the second constant-current source 62 and the third constant-current source 64 collectively instead of individually. The ROM in the memory 58 contains a single reference value indicating the overall luminance of the backlight. The RAM in the memory 58 contains a user-designated value relating to luminance. The microprocessor 54 compares a simple sum or a linear sum of the measurements derived from the first light-receiving part 31, the second light-receiving part 32 and the third light-receiving part 33 with the designated value or the reference value so as to effect feedback control. Whether the simple sum or the linear sum of the measurements should be used may be determined by experiments or the like.

With the construction described above, the second embodiment makes it possible to math the overall luminance of a backlight, instead of the color tone thereof, to the designated value or the reference value.

FIG. 3 shows the R light-emitting diodes of the first light-emitting part 21, the second light-emitting part 22 and the third light-emitting part 23 being connected in series, the G light-emitting diodes being connected in series and the B light-emitting diodes being connected in series. A constant-current source is provided for each of the series connection. Since the second embodiment is not designed for adjustment of a color tone, the connection involving the constant-current source allows for extensive flexibility. For example, the three light-emitting diodes in the first light-emitting part 21 may be connected in series and driven by the first constant-current source 60. Similarly, the three light-emitting diodes in the second light-emitting part 22 and the third light-emitting part 23 may be respectively connected in series so that the diodes are driven by the second constant-current source 62 and the third constant-current source 64, respectively. Such a configuration, in which the first light-emitting part 21, the second light-emitting part 22 and the third light-emitting part 23 are controlled independently, will be referred to an embodiment 2A. The microprocessor 54 according to the embodiment 2A may control the first constant-current source 60, the second constant-current source 62 and the third constant-current source 64 independently so that the measurements match the designated value or the reference value, as well as controlling them collectively as in the second embodiment. For example, when the light detected by the first light-receiving part 31 is higher in intensity than the light detected by the third light-receiving part 33, the third light-emitting part 23 closer to the third light-receiving part 33 than the other light-emitting parts may be controlled to produce a higher amount of light.

THIRD EMBODIMENT

Figure 4:
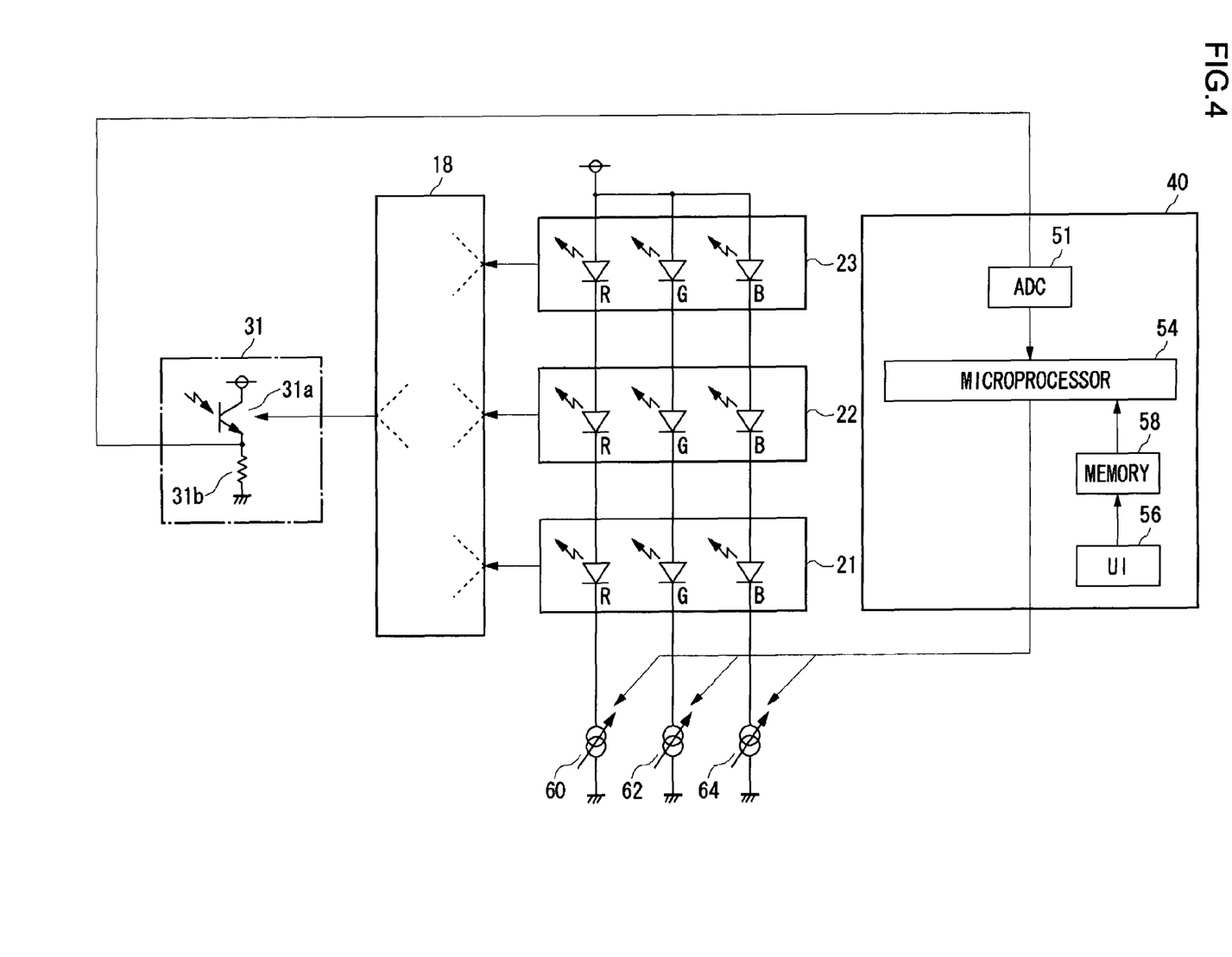
FIG. 4 schematically shows an overall construction in which a light-emission control circuit according to the third embodiment is applied to a liquid crystal display apparatus.

FIG. 4 schematically shows an overall construction in which a light-emission control circuit according to the third embodiment is applied to a liquid crystal display apparatus. Hereinafter, those elements that are identical to the elements of FIG. 3 are designated by the same reference symbols and the description thereof is omitted. The following description mainly concerns the difference from the configuration of FIG. 3.

As shown in FIG. 4, according to the third embodiment, the first light-receiving part 31, the second light-receiving part 32 and the third light-receiving part 33 of the measuring unit are replaced by the single light-receiving part 31. Correspondingly, the first A/D converter 51, the second A/D converter 52 and the third A/D converter 53 are replaced by the single A/D converter 51. The microprocessor 54 controls the first constant-current source 60, the second constant-current source 62 and the third constant-current source 64 collectively. The ROM in the memory 58 contains a single reference value indicating the overall luminance of a backlight. The RAM in the memory 58 contains a user-designated value relating to the luminance. The microprocessor 54 compares measurement by the first light-receiving part 31 with the reference value so as to effect feedback control.

With the construction described above, it is possible to match the overall luminance of a backlight to the reference value, using a simpler configuration than the second embodiment. In a similar configuration as the embodiment 2A, a variation to the third embodiment in which the first light-emitting part 21 etc. are independently controlled may be practicable as an embodiment 3A.

FOURTH EMBODIMENT

Figure 5:
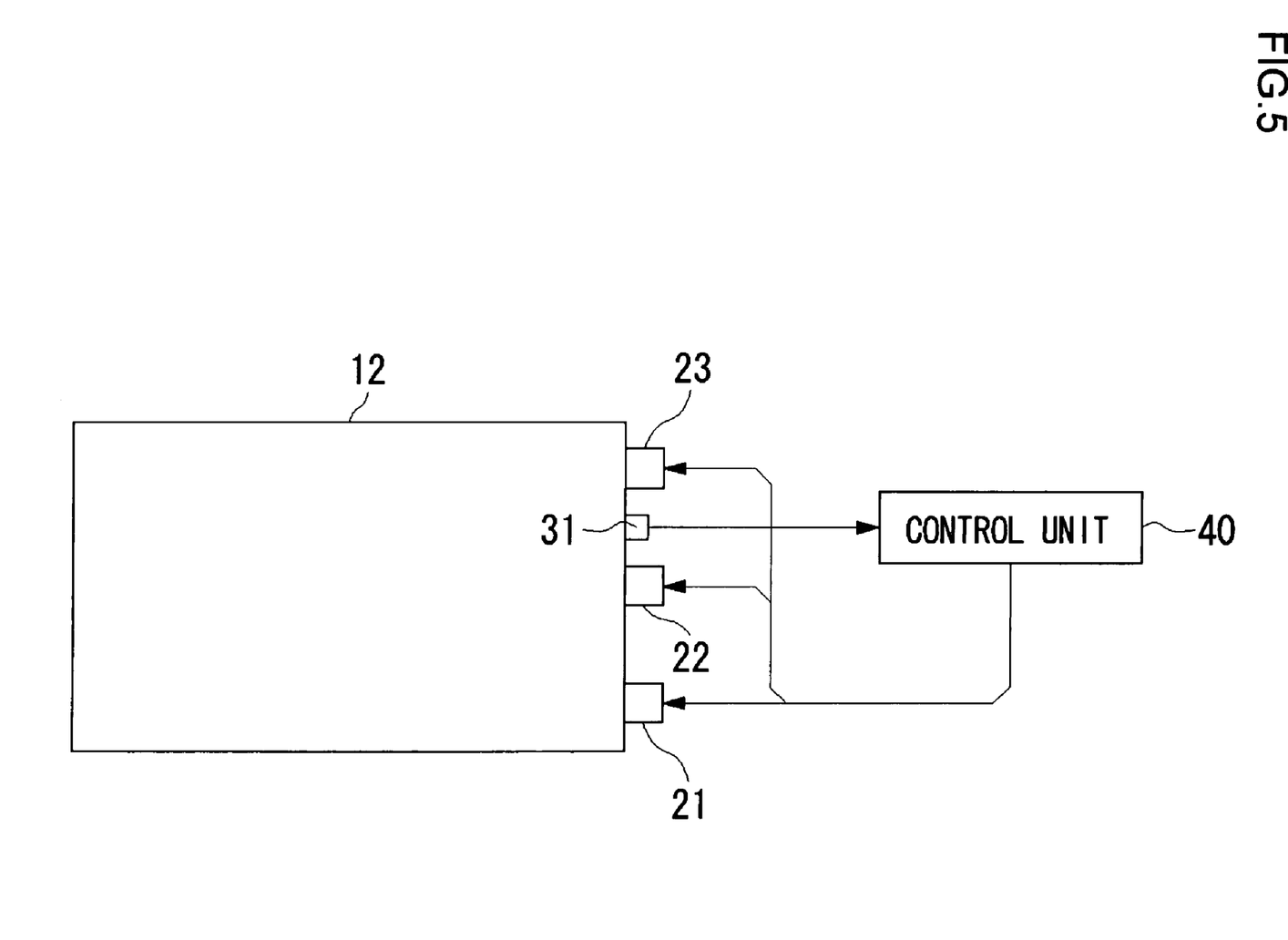
FIG. 5 shows an arrangement in which a measuring unit and a light source are provided on the same surface of a light guide plate.

In the third embodiment, the first light-receiving part 31 is provided on the light guide plate 18 opposite to the light source. In the fourth embodiment, these elements are provided in a coplanar arrangement. FIG. 5 shows such an arrangement. The location of the first light-emitting part 21, the second light-emitting part 22 and the third light-emitting part 23 are the same as those of the third embodiment. The difference from the third embodiment is that the first light-receiving part 31 is provided between the second light-emitting part 22 and the third light-emitting part 23. The other aspects of the arrangement are the same as the corresponding aspects of the third embodiment. By arranging the elements in close approximation to each other, designing of a mechanism is made easier.

To monitor the overall luminance of a backlight, the light-receiving parts constituting the measuring unit may be placed in close approximation to a light source. No significant difference from the non-coplanar arrangement exists since it is only necessary to perform experiments with the coplanar arrangement so as to know an appropriate reference value. The purpose is also served by placing the light-receiving part at an angle of 90 degrees to the plane on which the light source is provided. In principle, the light source and the light-receiving part may be of any arrangement as long as the light from the former reaches the latter. In a similar configuration as the embodiment 2A, a variation to the fourth embodiment in which the first light-emitting part 21 etc. are independently controlled may be practicable as an embodiment 4A.

FIFTH EMBODIMENT

Figure 6:
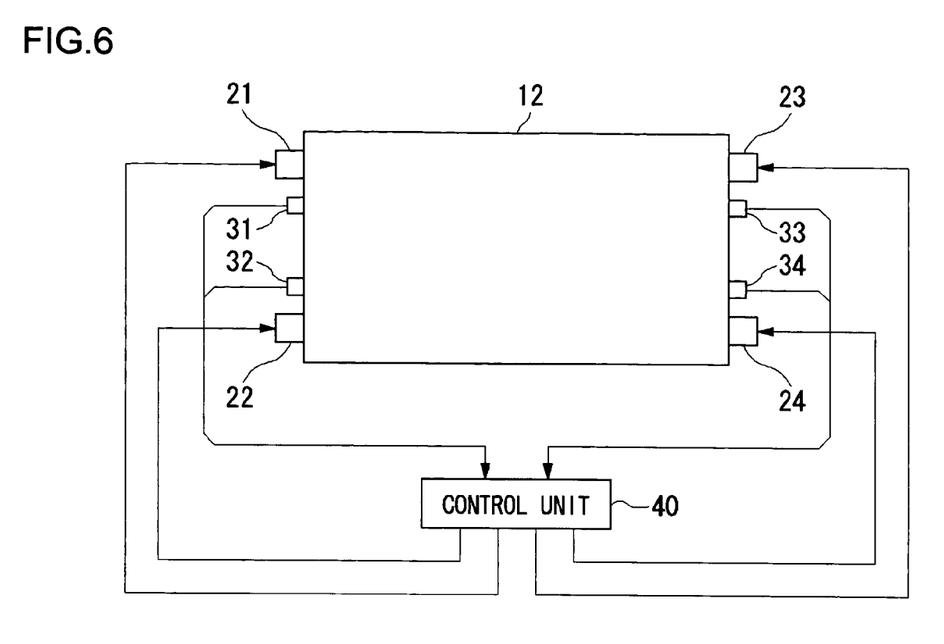
FIG. 6 shows an arrangement of light sources and light-receiving parts in the fifth embodiment.

In the fourth embodiment, only one light-receiving part is provided. In the fifth embodiment, the light-receiving parts are provided for respective light sources so that the light sources may be controlled individually. Thus, the fifth embodiment is based on a configuration in which the first light-emitting part 21 etc. are individually controlled, in a similar configuration as the embodiment 2A.

FIG. 6 shows an arrangement of the light sources and the light-receiving parts in the fifth embodiment. The first light-receiving part 31, the second light-receiving part 32, the third light-receiving part 33 and a fourth light-receiving part 34 are provided in close approximation to the first light-emitting part 21, the second light-emitting part 22, the third light-emitting part 23 and a fourth light-emitting part 24, respectively. In this example, the liquid crystal panel 10 has a longitudinal symmetry so that the first light-emitting part 21, the second light-emitting part 22, the third light-emitting part 23 and the fourth light-emitting part 24 are symmetrically arranged with respect to the center of the liquid crystal panel 10. The first light-receiving part 31, the second light-receiving part 32, the third light-receiving part 33 and the fourth light-receiving part 34 are similarly arranged. Theoretically, it is ideal in this construction that the first light-receiving part 31, the second light-receiving part 32, the third light-receiving part 33 and the fourth light-receiving part 34 give the same measurement. Of course, the first light-emitting part 21, the second light-emitting part 22, the third light-emitting part 23, the fourth light-emitting part 24, the first light-receiving part 31, the second light-receiving part 32, the third light-receiving part 33 and the fourth light-receiving part 34 may not be arranged symmetrically. In this case, experimental measurements are taken from the first through fourth light-receiving parts in a state in which the entirety of the backlight unit 12 is illuminated uniformly and a desired overall luminance is achieved. The measurements are then set as the reference values. Thus, according to the fifth embodiment, it is possible to configure the luminance of individual light sources properly, in addition to the overall luminance. As a result, ununiformity in luminance is reduced.

SIXTH EMBODIMENT

Figure 7:
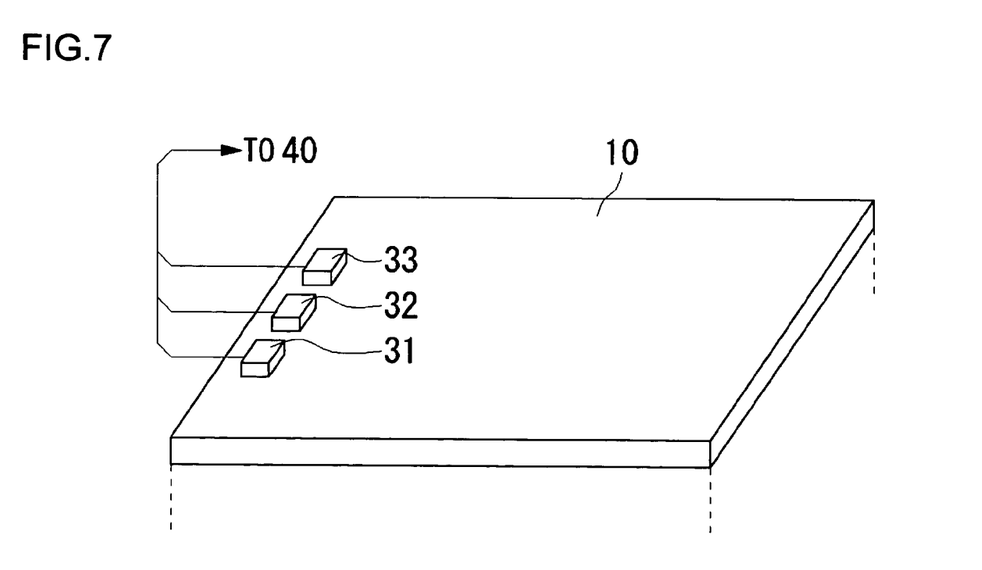
FIG. 7 shows an arrangement in which a measuring unit is provided on a liquid crystal panel.

In the first embodiment, the first light-receiving part 31, the second light-receiving part 32 and the third light-receiving part 33 are adhesively attached to the side of the light guide plate 18 opposite to the side on which the first light-emitting part 21, the second light-emitting part 22 and the third light-emitting part 23 are provided. In the sixth embodiment, the first light-receiving part 31, the second light-receiving part 32 and the third light-receiving part 33 are adhesively attached to the liquid crystal panel 10. FIG. 7 shows an arrangement involving the first light-receiving part 31, the second light-receiving part 32, the third light-receiving part 33 and the liquid crystal panel 10. The first light-receiving part 31, the second light-receiving part 32 and the third light-receiving part 33 are provided on the upper surface of the liquid crystal panel 10 and within an active display area. The first light-receiving part 31, the second light-receiving part 32 and the third light-receiving part 33 may preferably be formed using low-profile components. Generally, the liquid crystal panel 10 and the light guide plate 18 are integrally sealed in a housing (not shown) and an opening in the housing for the liquid crystal panel 10 is smaller than the liquid crystal panel 10. A certain marginal area of the liquid crystal panel 10 is thus concealed by the housing. Accordingly, visual appearance does not suffer by arranging the first light-receiving part 31, the second light-receiving part 32 and the third light-receiving part 33 at locations concealed by the housing.

With this construction, it is possible to detect the amount of light transmitted by the liquid crystal panel 10. Therefore, the user is capable of knowing the color tone and the luminance as actually experienced when viewing the liquid crystal panel 10 and matching the detected color tone and luminance to the designated value or the reference value. It is also possible to effect control in which time-dependent change and unit-to-unit variation of the liquid crystal panel 10 are taken into consideration.

In the sixth embodiment, the measurements depend on what is displayed on the liquid crystal panel 10. Therefore, the microprocessor 54 may preferably cause a known test image to be displayed at an initializing process at power-on so that the measurement and feedback control are completed while the image is displayed. The configuration according to the sixth embodiment in which the light transmitted through the liquid crystal panel 10 is detected is equally practicable in any of the second through fifth embodiments as well as in the first embodiment.

The embodiments are described as examples and many other variations in the constituting elements and the combination of individual processing units are possible. It will be known to those skilled in the art that those variations are within the scope of the present invention. Some such variations will be discussed.

In the above-described embodiments, light-emitting diodes are used as light-emitting devices. Alternatively, the light-emitting devices may be electro-luminescence (EL) devices. Light-emitting devices producing different colors or light-emitting devices producing an identical color may be used as desired depending on the purpose of the embodiment.

In the above-described embodiments, the control unit 40 and the measuring unit including the first light-receiving part 31 etc. constitute a light-emission control circuit. Alternatively, a light-emission control circuit may additionally comprise any one of a plurality of elements including a light source such as the first light-emitting part 21, the light guide plate 18, the backlight unit 12, the liquid crystal panel 10 and a driving circuit such as the first constant-current source 60.

What is claimed is:

1. A light-emission control circuit comprising:
   n light-emitting devices, where n is an integer equal to or greater than 2;
   a light guide plate which causes light emitted by the n light-emitting devices to reach the entirety of the back of a liquid crystal panel;
   a measuring unit for measuring the luminance of the entirety of the n light-emitting devices operating in the liquid crystal panel, the measuring unit comprising a phototransistor and a resistor which are coupled in series between a power supply and a ground; and
   a control unit for comparing the measured luminance with a predetermined value and controlling the luminance of the n light-emitting devices, based on a result of comparison, wherein
   the n light-emitting devices are provided on a side of the light guide plate, and the measuring unit is provided opposite to the side.

2. The light-emission control circuit according to claim 1, wherein said control unit controls the luminance of the n light-emitting devices so that a light transmitted by the liquid crystal panel is a reference white light.

3. The light-emission control circuit according to claim 1, wherein the control unit comprises a memory for containing user-designated color tone configuration information, and a microprocessor for controlling the luminance of the n light-emitting devices by feedback control so as to match the measurements by the measuring unit to the color tone configuration information.

4. A light-emission control circuit comprising:
   n light-emitting devices, where n is an integer equal to or greater than 2;
   a light guide plate which causes light emitted by the n light-emitting devices to reach the entirety of the back of a liquid crystal panel;
   a measuring unit measuring the luminance of the entirety of the n light-emitting devices operating in the liquid crystal panel, the measuring unit comprising a phototransistor and a resistor which are coupled in series between a power supply and a ground; and
   a control unit for comparing the measured luminance with a predetermined value and controlling the luminance of the n light-emitting devices, based on a result of comparison, wherein
   the n light-emitting devices and the measuring unit are provided on a same side of the light guide plate.

5. The light-emission control circuit according to claim 4, wherein said control unit controls the luminance of the n light-emitting devices so that a tight transmitted by the liquid crystal panel is a reference white light.

6. The light-emission control circuit according to claim 4, wherein the control unit comprises a memory for containing user-designated color tone configuration information, and a microprocessor for controlling the luminance of the n light-emitting devices by feedback control so as to match the measurements by the measuring unit to the color tone configuration information.

7. A light-emission control circuit comprising:
   n light-emitting devices, where n is an integer equal to or greater than 2;
   a light guide plate which causes light emitted by the n light-emitting devices to reach the entirety of the back of a liquid crystal panel having longitudinal symmetry;
   a plurality of measuring units for measuring the luminance of the entirety of the n light-emitting devices operating in the liquid crystal panel, each of the plurality of measuring units comprising a phototransistor and a resistor which are coupled in series between a power supply and a ground; and a control unit for comparing the measured luminance with a predetermined value and controlling the luminance of the n light-emitting devices, based on a result of comparison, wherein the n light-emitting devices are symmetrically provided on the side of the light guide plate with respect to the center of the liquid crystal panel, and the plurality of measuring units are respectively provided in close approximation to the n light-emitting devices in one-to-one correspondence with the n light-emitting devices.

8. The light-emission control circuit according to claim 7, wherein said control unit effects control so that the n light-emitting devices produce the same luminance.

9. The light-emission control circuit according to claim 7, wherein said control unit compares the overall luminance produced by the n light-emitting devices with a predetermined value and controls the luminance according to a result of comparison.

10. The light-emission control circuit according to claim 1, wherein the liquid crystal panel is arranged between the n light-emitting devices and said measuring unit, and wherein said measuring unit measures the color components included in the light transmitted by the liquid crystal panel.

11. The light-emission control circuit according to claim 4, wherein the liquid crystal panel is arranged between the n light-emitting devices and said measuring units, and wherein said measuring units measure the color components included in the light transmitted by the liquid crystal panel.

12. The light-emission control circuit according to claim 7, wherein the liquid crystal panel is arranged between the n light-emitting devices and said measuring unit, and wherein said measuring unit measures the luminance of a light transmitted by the liquid crystal panel.

13. An electronic information apparatus wherein a backlight is controlled by the light-emission control circuit according to claim 1.

14. An electronic information apparatus wherein a backlight is controlled by the light-emission control circuit according to claim 4.

15. An electronic information apparatus wherein a backlight is controlled by the light-emission control circuit according to claim 7.

16. The light-emission control circuit according to claim 7, wherein the control unit comprises a memory for containing user-designated color tone configuration information and a microprocessor for controlling the luminance of the n light-emitting devices by feedback control so as to match the measurements by the measuring wilt to the color tone configuration information.

17. The light-emission control circuit according to claim 1, wherein the measuring unit outputs a voltage signal corresponding to the luminance of the entirety of the n light-emitting devices from a node between the phototransistor and the resistor to the control unit.

18. The light-emission control circuit according to claim 7, wherein the measuring unit outputs a voltage signal corresponding to the luminance of the entirety of the n light-emitting devices from a node between the phototransistor and the resistor to the control unit.

19. The light-emission control circuit according to claim 1, wherein the measuring unit further comprises a filter provided between the light guide plate and the phototransistor.

20. The light-emission control circuit according to claim 7, wherein each of the plurality of measuring units further comprises a filter provided between the light guide plate and the phototransistor.

* * * * *